May 23, 1933.  N. V. FEDOTOFF  1,910,827
VACUUM TUBE VOLTMETER
Filed June 11, 1930
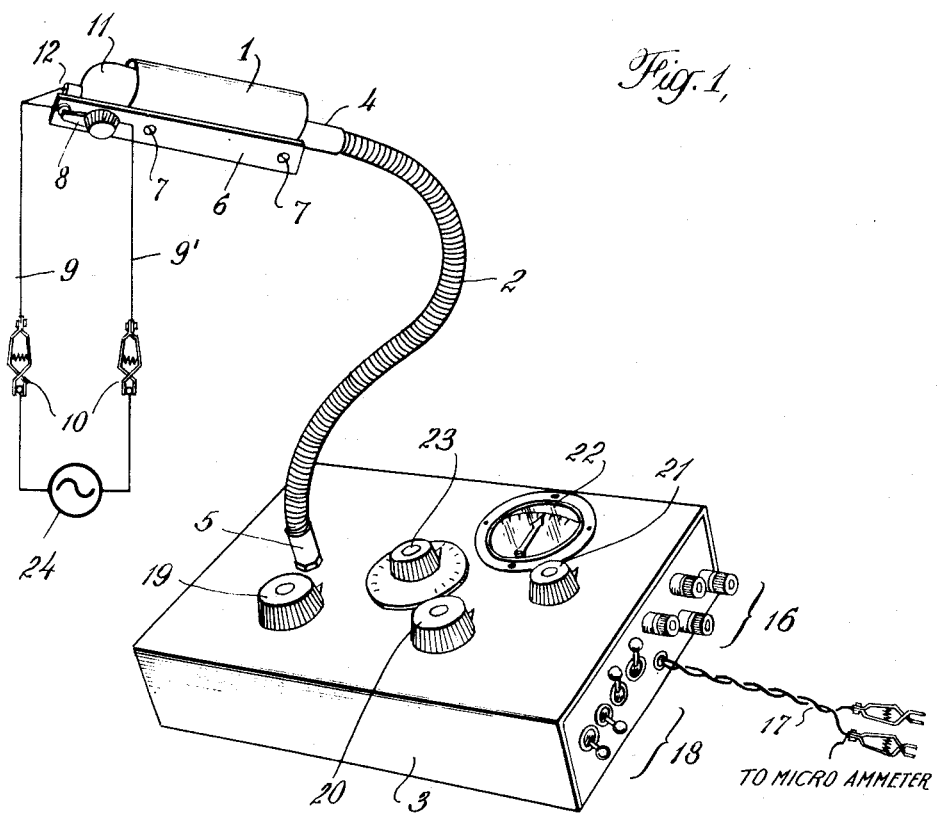
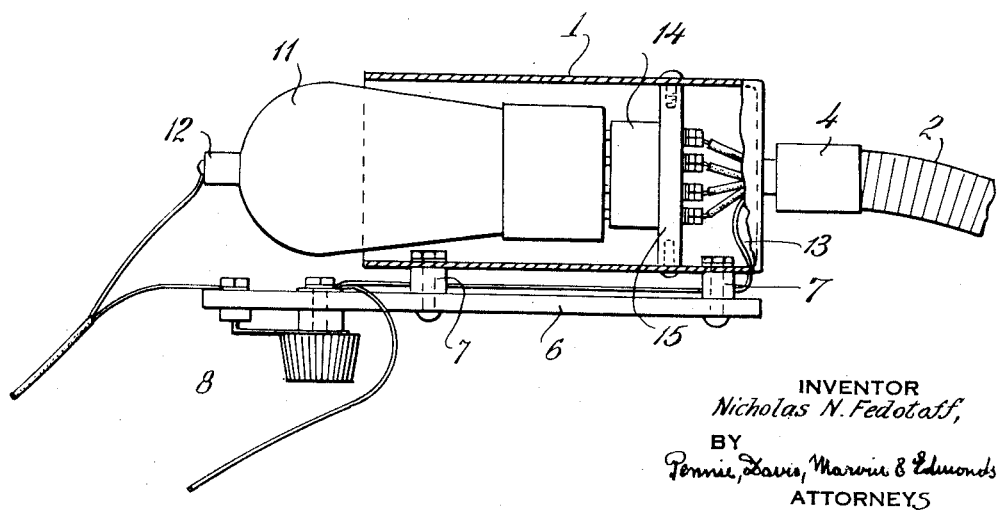
INVENTOR
Nicholas N. Fedotoff,
BY
Pennie, Davis, Marvin & Edmonds
ATTORNEYS Patented May 23, 1933

1,910,827

UNITED STATES PATENT OFFICE

NICHOLAS V. FEDOTOFF, OF LYNBROOK, NEW YORK, ASSIGNOR TO HAZELTINE CORPORATION, A CORPORATION OF DELAWARE

VACUUM-TUBE VOLTMETER

Application filed June 11, 1930. Serial No. 460,374.

This invention relates to improvements in electric measuring devices and more particularly to vacuum tube voltmeters.

An object of this invention is to provide a measuring instrument in a compact and rugged form adapted to indicate feeble electromotive forces such as are encountered, for example, in radio frequency or audio frequency circuits.

Another object of this invention is to increase the efficiency and usefulness of such devices, and to this end certain novel mechanical features are provided which lend ruggedness, ease of handling, and accuracy of performance to the device.

In the use of highly sensitive vacuum tube voltmeters great disadvantages have been encountered due to the rather fragile construction of the apparatus. In the past these instruments were made of several mechanically separated components which spread over a large area and which could be moved from place to place only with difficulty and danger of breakage. Long leads had to be used to connect the input circuit to the source of voltage to be measured, which further introduced errors due to the capacity coupling between the conductors. At relatively high frequencies, for example, in radio frequency measurements, errors due to the capacity coupling greatly limited the practical usefulness of the instrument.

According to the present invention the components of the apparatus are combined in a single, compact, mechanically rugged device which may be safely moved from place to place with comparative ease. A further mechanical advantage of the device resides in the flexible mounting of the vacuum tube. As a preferred embodiment of this invention, a metallic tubing, commercially referred to as "goose-neck," is used for the flexible mounting of the vacuum tube. It is to be understood, however, that other mounting means, such as jointed rods or the so-called "lazy-tong" arrangement, can be employed without departing from the spirit of this invention. The tubing is sufficiently rigid to support the vacuum tube of the device permanently in the desired position and enables the operator to place it in close proximity to the voltage source to be measured. Thus, not only the compactness of the mechanical construction lends ease of handling, but this novel mechanical feature permits the taking of measurements in places difficult to reach or otherwise obstructed without the necessity of using long input leads with their consequent disadvantages.

A further difficulty which is intended to be overcome by this invention is the tendency of the component parts and wiring to pick up stray, undesired electric currents from nearby wires or apparatus. This is accomplished by effectively shielding all parts of the apparatus.

The invention is illustrated in the accompanying drawing in which:

Figure 1 is a perspective view of an embodiment of the invention; and

Figure 2 is a cross-sectional view of the vacuum tube holder and shield with its associated parts.

Referring to the drawing, Figure 1 illustrates a metal can 1, having one of its ends open to admit a vacuum tube 11, supported on the end of a semi-rigid flexible metal tubing 2, (commonly known as "goose-neck" tubing). On both ends of the goose-neck are threaded metal collars 4, and 5, which are adapted to be fastened by means of nuts, respectively, to the metal can 1 and to the top of metal box 3. The output leads from the vacuum tube 11 are preferably passed through the tubing 2, to connections inside the metal box 3, thus effectively shielding them from undesirable stray couplings. The top of the metal box 3, which contains component parts of the apparatus, also serves as an efficient base for the goose-neck 2; the total weight of the box and its contents being greater than the combined weight of the goose-neck and the parts which it supports.

A strip of insulating material 6, such as hard rubber or bakelite, is fastened to the can 1, by means of screws 7, to serve as a support for the rotary switch 8, which is suitably fastened thereto. The function of switch 8 is to short-circuit the input leads 9 of the vacuum tube 11 when they are not connected to an electrical circuit, or while changes are being made in the input circuit which might injure the micro-ammeter connected by leads 17. On the ends of the leads 9 and 9′, and electrically connected thereto, are test clips 10 which are connected to a source 24 of voltage to be measured. It has been found advantageous to connect the test lead 9, of the grid terminal 12, to the high-potential point of the circuit to be measured. This lead should be relatively short and attached to the small stud of switch 8. The effects of the electrostatic and electro-magnetic fields around this lead are thereby greatly minimized. Test lead 9′ is usually attached to the grounded portion of the circuit to be measured, and, therefore, its length is not critical. Switch arm 8 can be of any convenient style since it is on the grounded side of the instrument. This construction also is partly responsible for the low intrinsic input capacity of this device.

Vacuum tube 11, of Figure 2, is of the screen-grid type having a control-grid contact 12. The arm of switch 8 is electrically connected to the negative side of the "B" voltage supply through wire 13, while the stud of switch 8 is electrically connected to the control grid contact 12, of vacuum tube 11. The other ends of the input leads 9 and 9′ are electrically connected, one to the arm of switch 8, and the other to the common point of connection between grid contact 12, of vacuum tube 11, and the stud of switch 8.

Vacuum tube socket 14, with its base 15, fits inside the can 1, and is there held in place by screws extending through the walls of can 1, and engaging the base 15. The requisite "A" and "B" battery supplies for the apparatus may be connected to the binding posts 16, which are fastened on the outside of the metal box 3, and suitably insulated therefrom. A length of twisted lamp cord 17 comprises the output leads of the apparatus, to which may be connected a very sensitive current-measuring device such as, for example, a micro-ammeter. Electric switches 18, fastened on the outside of metal box 3, and electrically insulated therefrom, are provided to control the "A" and "B" battery supply and the voltmeter 22. Control knobs 19, 20 and 21, extending through the top of metal box 3, are adapted to control variable electrical resistance units which are suitably fastened to the under side of the top of metal box 3. The voltmeter 22, which is set into and suitably fastened to the top of metal box 3, is provided to measure the filament and plate voltages of vacuum tube 11.

The control knob 23, of a three-position rotary switch, is provided to prepare the apparatus for the measuring operation. Position "1" is the "off" position of the switch, at which position the associated micro-ammeter is not connected in the electrical circuit. When the switch is set at position "2", the amount of current flowing in the plate circuit of the vacuum tube 11, may be adjusted to the proper value by rotating the variable resistance control knob 19, until a reading of 5 micro-amperes is obtained on the associated micro-ammeter. The switch is then turned to position "3" and the variable resistance control knob 21 is rotated until a zero reading is obtained on the micro-ammeter.

The invention claimed is:—

1. In a vacuum tube voltmeter, the combination of a shielding structure comprising a housing which contains a vacuum tube having input leads and output leads, said input leads being adapted to be connected to a source of alternating current, means to divert the path of said current, and means flexibly supporting said shielding structure whereby said tube may be placed in any desired position.

2. In an electrical measuring device, the combination of a shielding structure comprising a housing which contains a vacuum tube having input leads and output leads, said input leads being adapted to be connected to a source of voltage to be measured, means supported on said housing operable to render said measuring device unresponsive to said source, and means flexibly supporting said shielding structure whereby said tube may be placed in any desired position.

3. In an electrical indicating device of unified mechanical structure, the combination of a base member comprising a casing of electrically conductive material, a shielding structure containing a vacuum tube having input leads and output leads, means for adjustably supporting said shielding structure upon said base member and connecting said shielding structure with said casing, and means supported on said shielding structure operable to shunt said input leads.

4. In an electrical indicating device of unified mechanical structure, the combination of a vacuum tube having input leads and output leads, a base member comprising a casing, and means to flexibly support said vacuum tube on said casing, said supporting means being of electrical conducting material and enclosing said output leads, whereby the input capacity of said device is maintained substantially constant, regardless of changes in the position of said vacuum tube with respect to said base member.

5. In a vacuum tube voltmeter the combination of a casing containing adjusting apparatus, a vacuum tube having input leads and output leads, said input leads serving to connect said tube to a source of voltage to be measured and said output leads serving to connect said tube with said apparatus, a shielding structure for said vacuum tube, an adjustable connecting member between said shielding structure and said casing, said member being so constructed as to electrically and mechanically shield said output leads, and also to support said vacuum tube in proximity to the source of voltage to be measured.

6. In a vacuum tube voltmeter, the combination of a base comprising a metallic casing, a shielding structure containing a vacuum tube having input leads and output leads, the input leads serving to connect said tube to a source of voltage to be measured, a flexible tubular member supporting said shielding structure on said base, said member being so constructed as to completely envelope and electrically shield said output leads and support said tube in proximity to said source of voltage.

In testimony whereof I affix my signature.

NICHOLAS V. FEDOTOFF.